US012251643B2

(12) United States Patent
Walker et al.

(10) Patent No.: US 12,251,643 B2
(45) Date of Patent: Mar. 18, 2025

(54) INTERACTIVE MUSIC PLAY SYSTEM

(71) Applicant: LEGO A/S, Billund (DK)

(72) Inventors: Morgan James Walker, Billund (DK); Henrik Munk Storm, Billund (DK)

(73) Assignee: LEGO A/S, Billund (DK)

( * ) Notice: Subject to any disclaimer, the term of this patent is extended or adjusted under 35 U.S.C. 154(b) by 176 days.

(21) Appl. No.: 17/635,416

(22) PCT Filed: Aug. 20, 2019

(86) PCT No.: PCT/EP2019/072271
§ 371 (c)(1),
(2) Date: Feb. 15, 2022

(87) PCT Pub. No.: WO2021/032289
PCT Pub. Date: Feb. 25, 2021

(65) Prior Publication Data
US 2022/0266159 A1    Aug. 25, 2022

(51) Int. Cl.
*A63H 3/00* (2006.01)
*A63H 5/00* (2006.01)
(52) U.S. Cl.
CPC .............. *A63H 3/003* (2013.01); *A63H 5/00* (2013.01); *A63H 2200/00* (2013.01)
(58) Field of Classification Search
CPC ...... A63H 3/003; A63H 5/00; A63H 2200/00; A63H 3/28; G06T 19/006; G06V 20/20; G06V 30/30
See application file for complete search history.

(56) References Cited

U.S. PATENT DOCUMENTS 6,454,627 B1 *  9/2002  Mak ..................... A63H 3/003
                                                         446/408
9,033,795 B2 *  5/2015  Yum ..................... A63F 13/814
                                                          463/31
(Continued)

FOREIGN PATENT DOCUMENTS

CN      101350905 A    1/2009
CN      103079661 A    5/2013
(Continued)

OTHER PUBLICATIONS

International Search Report and Written Opinion issued in corresponding international patent application No. PCT/EP2019/072271, mailed Nov. 4, 2019, 12 pages.
(Continued)

*Primary Examiner* — William H McCulloch, Jr.
*Assistant Examiner* — Ankit B Doshi
(74) *Attorney, Agent, or Firm* — Day Pitney LLP; George Chaclas; Anthony A. Kassas

(57) ABSTRACT

An interactive music play system, comprising a plurality of toy elements, an image capturing device, a processing unit and a music rendering device; wherein the image capturing device is configured to capture one or more images of a user-selected subset of said toy elements arranged in a field of view of the image capturing device; wherein the processing unit is configured to: recognise the user-selected subset of toy elements in the one or more captured images; create a musical presentation based on one or more of the recognised toy elements; cause the music rendering device to present the created musical presentation to the user.

16 Claims, 7 Drawing Sheets

(56) References Cited

U.S. PATENT DOCUMENTS

| | | | |
|---|---|---|---|
| 9,183,755 B2 | 11/2015 | Zheng | |
| 10,319,410 B1* | 6/2019 | Townsend | G11B 27/30 |
| 10,661,191 B1* | 5/2020 | Reeves | A63H 11/10 |
| 10,847,007 B1* | 11/2020 | Felix | G08B 21/0291 |
| 2003/0103020 A1* | 6/2003 | Kim | A63H 3/003 |
| | | | 345/76 |
| 2003/0139113 A1* | 7/2003 | Wood | A63H 30/00 |
| | | | 446/175 |
| 2003/0162475 A1* | 8/2003 | Pratte | A63H 3/28 |
| | | | 446/175 |
| 2010/0173709 A1* | 7/2010 | Horovitz | G06V 30/304 |
| | | | 463/35 |
| 2011/0242134 A1 | 10/2011 | Miller et al. | |
| 2013/0072080 A1* | 3/2013 | Garbos | A63H 33/38 |
| | | | 446/175 |
| 2013/0203492 A1 | 8/2013 | Yum | |
| 2013/0239783 A1 | 9/2013 | Tabata et al. | |
| 2013/0303047 A1* | 11/2013 | Albert | A63H 33/00 |
| | | | 446/175 |
| 2014/0113728 A1 | 4/2014 | Tezuka et al. | |
| 2014/0349761 A1 | 11/2014 | Kruge | |
| 2015/0187108 A1 | 7/2015 | Mullins | |
| 2017/0157511 A1* | 6/2017 | Feghali | H04W 4/80 |
| 2017/0186411 A1* | 6/2017 | Mintz | A63F 9/24 |
| 2017/0287456 A1* | 10/2017 | Zund | A63F 13/92 |

FOREIGN PATENT DOCUMENTS

| | | |
|---|---|---|
| CN | 103998107 A | 8/2014 |
| EP | 1548635 A1 | 6/2005 |
| EP | 3042704 A1 | 3/2019 |
| KR | 20120056489 A | 6/2012 |

OTHER PUBLICATIONS

First Examination Report issued in corresponding Danish patent application No. PA 2018 70539, mailed Feb. 20, 2019, 10 pages.

Miller et al., "Interactive 3D Model Acquisition and Tracking of Building Block Structures," IEEE Transactions on Visualization and Computer Graphics, vol. 18, No. 14, Apr. 2012, IEEE Computer Society, pp. 651-659.

CN Office Action corresponding to Application No. 201980101314. 1, dated Apr. 26, 2024, 11 pages (English Translation).

* cited by examiner

INTERACTIVE MUSIC PLAY SYSTEM

The present application is a U.S. national stage application under 35 U.S.C. 371 of co-pending International Application No. PCT/EP2019/072271 filed on Aug. 20, 2019, the contents of which are incorporated by reference herein in their entirety for all purposes.

TECHNICAL FIELD

The present disclosure relates to the application of computer vision technology for toys-to-life applications and, more particularly, to an interactive music play system employing such technology.

BACKGROUND

Different attempts of integrating physical objects into virtual play have been made. However, it remains desirable to provide ways of linking the physical world and a virtual play experience which may stimulate the interactive involvement of the user and provide an entertaining play experience. Therefore there is a need for a new approach to interactive play.

U.S. Pat. No. 8,017,851 discloses a system and method for physically interactive music games.

U.S. Pat. No. 9,183,755 discloses a system and method for learning, composing, and playing music with physical objects.

In view of this prior art it remains desirable to provide improved systems that provide additional mechanisms for versatile interactions by the user with the digital system and that provide an entertaining play experience.

SUMMARY

Disclosed herein are various aspects of an interactive music play system. The interactive music play system comprises a plurality of toy elements, an image capturing device, a processing unit and a music rendering device.

The image capturing device is configured to capture one or more images of a user-selected subset of said toy elements arranged in a field of view of the image capturing device. The one or more images may be captured as one or more still images or as a stream of video images.

The processing unit is configured to:
recognise the user-selected subset of toy elements in the one or more captured images;
create a musical presentation based on one or more of the recognised toy elements; and to
cause the music rendering device to present the created musical presentation to the user.

The audio rendering device comprises an audio output for presenting an audible presentation of the music. The musical presentation may be an audio-visual presentation. Accordingly, the audio rendering device may further comprise a display for presenting a visual portion of the audio-visual musical presentation, e.g. including a visual representation of one or more performers presenting the music. The visual presentation may be in the form of a partially or completely animated video. Accordingly, creating the musical presentation may comprise creating an audio presentation or an audio-visual presentation.

According to a first aspect, the processing unit is further adapted to:
cause, responsive to one or more of the recognized toy elements, the music rendering device to provide, one or more user-activatable user-interface elements, and to
cause the music rendering device to alter, responsive to a user-activation of one or more of the user-interface elements, the presented musical presentation.

Accordingly, the created musical presentation is an interactive presentation that may be modified by the user by activating the user-interface elements. The user-interface elements may be graphical user-interface elements displayed on a display, such as a touch screen, such as virtual buttons, sliders, dials, etc. that may be activated e.g. by the user interacting with the touch screen at a location corresponding to the displayed user-interface element. To this end, at least some of the toy elements may represent or otherwise be associated with a respective user-activatable virtual function and, in particular, a modification of the musical presentation. Examples of such functions may be the display of visual effects as part of the visual presentation, the modification of a virtual character representing an artist performing a piece of music, the playing of sounds in addition to the music, the altering of the music, and/or the like. Examples of modifications of a virtual character may include a change of the visual appearance of the virtual character, e.g. the change of the character's costume, accessories, facial expression, hair style, etc. Other examples of modifications of a virtual character may include changes to the behaviour of the virtual character, e.g. by triggering selected dance moves, and/or the like.

Accordingly, the system allows the user to customize the user interface and to select preferred functions to be activatable by user-interface elements. Accordingly, an easy to use mechanism of selecting a number of user-interface elements that are to be provided, e.g. to be positioned on the display, is provided. This is particularly useful as the available display area and, hence, the number of user-interface elements that can be positioned within the display area without obscuring the musical presentation to be displayed is rather limited. Accordingly only relatively few user-interface elements can be positioned within the display area and be reliably activatable. As the system may include a large number of possible functions, a selection of a subset of activatable functions may therefore be necessary. This selection may involve a tedious task of finding and selecting functions in a menu, a process which is notoriously difficult for children. The present system provides an interactive mechanism for customizing the user-interface that utilizes a tangible and intuitive interaction with the physical toy elements.

In some embodiments, the plurality of toy elements may comprise a plurality of computer-recognizable tokens, such as tiles or other toy elements that are configured to be recognized by the processing unit in the captured one or more images. In particular, the tokens may be configured to be individually recognizable and distinguishable from each other. For example, the tokens may include respective one or more visually recognizable markers, e.g. color codes, geometric patterns, decorations and/or other form of insignia. Alternatively or additionally, the tokens may have respective recognizable shapes. It will be appreciated that the processing unit may be configured to recognize the tokens and to distinguish different tokens from each other by means of respective markers, respective color codes, respective shapes of the tokens and/or based on a combination of one or more of the above and/or other visually recognizable features. For example, different tokens may represent respective user-activatable functions and corresponding user-interface elements for activating the associated functions. In some embodiments, certain combinations of tokens may also be associated with certain user-interface elements. Hence, the processing unit may be configured to detect combinations of tokens and select a function and a corresponding user-interface element responsive to the detected combination.

Accordingly, in some embodiments, the plurality of toy elements comprises a plurality of tokens configured to be individually recognizable and distinguishable from each other by the processing unit in an image depicting at least one or more of the tokens; and the processing unit is further adapted to:

- cause the music rendering device to provide, responsive to recognizing one or more of the tokens in the one or more captured images, one or more user-activatable user-interface elements, in particular one or more user-interface elements associated with one or more of the recognized tokens, and to
- cause the music rendering device to alter, responsive to a user-activation of one or more of the user-interface elements, the presented musical presentation.

Altering may be in real-time, i.e. during the presentation of the musical presentation, thus allowing the user to affect the presentation while the user watches and listens to the musical presentation. The effect or function triggered by activating a user-interface element may thus be activated directly in response to the activation of the user-interface element, in particular substantially instantaneously or with only a short delay such that the user clearly recognizes the activation of the function as having been triggered by the activation of the user-interface element.

The musical presentation includes music, such as a piece of music, e.g. a song such as a song of popular music. The musical presentation may include a visual representation of one or more performers/artists presenting the music.

In some embodiments, the system may be configured to select one or more virtual characters and use the selected one or more virtual characters as performers, i.e. to create a visual presentation showing the one or more virtual characters performing a piece of music. The system may have stored or otherwise have access to a plurality of virtual characters that can be selected, e.g. as suitable data structures representing the visual appearance and virtual behaviour of the virtual characters. The selection of the virtual character may be automatic, responsive to a user input or responsive to another trigger. For example, the virtual character may be selected randomly from a stored set of characters, or based on a user selection of a character from the set of stored characters, or based on a recognized physical toy figurine and/or the like. The system may allow the user to customize the selected virtual character, e.g. by adding clothing items, accessory items, musical instruments etc. Other examples of customizations may include the assignment of capabilities, such as dance moves, vocal capabilities, the ability to play certain instrument solos, etc.

In some embodiments, the plurality of toy elements comprises one or more figurines, each representing an artist or music performer. The processing unit may be configured to recognize one or more figurines in the one or more captured images. To this end at least some of the captured images may depict the one or more figurines alone or together with one or more other toy elements, e.g. tokens as described herein. In some embodiments, the processing unit is configured, responsive to recognizing the one or more figurines in the one or more captured images, to select corresponding one or more virtual characters associated with the recognized one or more figurines and to create a visual presentation showing the one or more virtual characters performing a piece of music.

Alternatively or additionally, the processing unit may be configured, responsive to recognizing the one or more figurines in the one or more captured images, to provide another function associated with one or more virtual characters associated with the recognized one or more figurines and to include the function in the created musical presentation. Examples of such functions may include unlocking and/or triggering one or more capabilities of the virtual character or other functions involving the virtual character, e.g. a function allowing the user to create a recording of the musical presentation involving the virtual character, allowing a user to define dance moves to be performed by the virtual character, etc. Accordingly, in some embodiments, the plurality of toy elements comprises one or more figurines, each representing an artist or music performer and wherein the processing unit is configured to create an interactive audio-visual presentation showing a virtual character performing a piece of music and, responsive to recognizing the one or more figurines as corresponding to the virtual character, to modify the created interactive audio-visual presentation.

The one or more figurines and the tokens may be recognized in a single image, i.e. the processing unit may be configured to detect one or more figurines and one or more tokens in the same image. Detecting a figurine and one or more tokens in the same image provides a simple mechanism for allowing the user to cause the system to associate selected user-activatable functions with a particular virtual character. In other embodiments, the processing unit may be configured to detect one or more figurines and one or more tokens in respective images.

In some embodiments, the image capturing device is further adapted to capture one or more images of a real-world scene or of a representation of such a scene; and wherein the processing unit is configured to create a visual presentation showing the virtual character moving about the scene and performing a piece of music. The scene may e.g. represent a stage or another location for a music performance. In some embodiments the toy elements comprise a plurality of toy construction elements allowing the user to build a stage or other scene. The tokens and/or figurine may be toy construction elements (or constructed from toy construction elements) compatible with the toy construction elements for building the stage. Accordingly, the user may engage in physical play in addition to a virtual play experience.

The recognition of one or more figurines and/or tokens and the capturing of an image of a scene may be based on a single captured image (or a single video stream) or on in respective captured images/video streams.

In some embodiments, the image capturing device may be configured to initially capture one or more images of the one or more figurines and, optionally, of one or more tokens. The image capturing may be configured to subsequently capture a video of a real-world scene and to augment the captured video with a virtual character moving about the real-world scene and performing a piece of music. The processing unit may further be configured to augment the captured video with one or more user-interface elements selected based on the recognized tokens.

According to a second aspect, at least one of the toy elements is a figurine; wherein the image capturing device is further adapted to capture one or more images of a real-world scene; and wherein creating the musical presentation comprises:

selecting at least one virtual character responsive to the recognized figurine;

creating a visual portion of an audio-visual musical presentation from the one or more captured images of the real-world scene and including a representation of the selected at least one virtual character within the scene;

animating the representation of the virtual character to represent performance of a piece of music by said virtual character within the scene.

The real-world scene may have a scale corresponding to the figurine or it may have a different scale. For example, the figurine may have a size of one or a few centimetres, while the real-world scene may correspond to the environment of the user, e.g. a real-world stage for human size artists, the room or outdoor environment where the user is located. Alternatively, the image of a real-world scene may be an image of a toy model, e.g. a toy construction model of a stage or other location, where the toy model may or may not be at the same scale as the figurine. Animating the representation of the virtual character may thus include scaling the representation of the virtual character relative to the scene. The scaling may be responsive to a user input and/or based on an automatic detection of a scale, e.g. from the captured image(s).

The acquisition of one or more images of an object for recognition of the object and/or for importing a representation of the object into a digital environment will also be referred to as "scanning" the object. Accordingly, a system is provided that allows a user to scan a scene (e.g. a toy construction model) and to scan a physical figure and/or modifier tokens, e.g. tags, tiles, markers etc. The system then presents a virtual scene (or an image or video of the captured scene) where one or more virtual characters move about the scene (e.g. move about a virtual/animated scene or as augmented reality content augmenting a video/image of the real-world scene), e.g. as part of a music performance, a story, etc. Aspects of the figure, the scene and/or the performance may then be modified by the system based on the scanned modifier tokens and/or the scanned figurine.

In some embodiments, the system may provide functionality allowing a user to define movements to be performed by one or more virtual character, e.g. dance moves. In some embodiments, the system may allow the definition of movements by a motion capture process. For example, a user may use the system to capture a video of a person performing a dance move or other movement. The system may be configured to capture the performed movement, preferably by a markerless technique, and to apply the captured movement to a virtual character. For example, to this end, the processing unit may process the captured video to detect the person, associate a virtual skeleton with the detected person and track movements of the virtual skeleton when the person moves. The processing unit may then map a corresponding virtual skeleton to the virtual character and cause the virtual character to move according to the tracked movements of the virtual skeleton.

According to a third aspect, the system comprises a storage container for storing the toy elements of the system described herein. The storage container may e.g. be a box made from a suitable material having a size and shape that it can easily be carried around by a user or even be put into a pocket. The storage container is configured such that it also includes or forms a support structure/scanning station for supporting the toy elements when an image is captured of the toy elements arranged in a predetermined spatial configuration relative to each other by the image capture device. Preferably, the support structure is configured to receive and retain the toy elements in a predetermined spatial configuration. Hence, a reliable acquisition of images suitable for recognizing the toy elements and, optionally, of the spatial configuration of multiple toy elements relative to each other is facilitated.

The container may be configured for accommodating one or more figurines and/or a plurality of tokens; wherein the container comprises a cover portion that is movable between an open state and a closed state, such that the figurine and/or the tokens can only be removed from the container when the cover is in its open state. The container further comprises or forms a support structure to which the figurine and/or at least a subset of the tokens can be detachably attached such that an image of the one or more figurines and/or tokens can be captured wherein the one or more figurines and/or tokens are arranged in a predetermined spatial configuration relative to each other and relative to the support structure.

In some embodiments the container is configured such that the support structure only allows capturing an image of the figurine and/or the tokens in the predetermined spatial configuration when the cover is in its open stage and/or when the support structure has been removed from the container.

To this end the support structure may be removable from the container or movable between a storage configuration and a scanning configuration. Alternatively or additionally, the cover may be configured to at least partially conceal the figurines and/or tokens from view when the cover is in its closed state.

In some embodiments, the support structure may be configured to receive tokens and/or one or more figurines in a single spatial configuration only, or in a limited number of spatial configurations. In some embodiments, the one or more tokens and/or figurines each comprise one or more coupling members and the support structure comprises one or more coupling members operable for interengaging corresponding coupling members of the tokens and/or figurines. The coupling members may be configured such that they allow a user to connect the tokens and/or figurine with the support structure in predetermined respective positions and/or orientations relative to the support structure such that the tokens and/or figurines can be detachably received by the support structure in one or a limited number of predetermined spatial configurations relative to each other; optionally such that the tokens and/or figurines can only be so received. Accordingly, the support structure serves to aid the correct placement of the tokens and/or figurines in one or more predetermined spatial configuration relative to each other, thus reducing the risk of unsuccessful recognition due to improper placement of the tokens and/or figurines. Moreover, the support structure also helps to ensure that the tokens and/or figurines remain in the predetermined spatial configuration during the image acquisition or in order to facilitate a repeated presentation of the same set of tokens and/or figurines. As the support structure is included or integrated in the container, a safe and easy handling and storing of the tokens and/or figurines is facilitated and the risk of loosing or damaging the toy elements is reduced.

In some embodiments, the processing unit is further configured to recognise the support structure in addition to recognising the one or more tokens and/or figurines attached to the support structure, when an image is captured of the support structure with the one or more tokens and/or figurines attached to it. For example, to this end, the support structure may carry a machine-readable marker or may have a visually recognisable shape or other visually recognisable features facilitating recognition of the support structure by the processing unit in a captured image. Recognition of the support structure may further reduce the risk of inadvertent recognition of elements. Alternatively or additionally, the support structure itself may serve as a token or as a further modifier/trigger that influences the play experience. Yet alternatively or additionally, the support structure may represent a scene or a part thereof.

In yet another embodiment, the support structure may serve as a physical unlock key whose recognition enables triggering of further play experiences or otherwise influences the play experience.

In some embodiments, the predetermined spatial configuration comprises a two dimensional arrangement of two or more tokens and/or figurines. Generally, a predetermined spatial configuration of two or more elements relative to each other may be defined completely or in part by the respective positions of the two or more elements relative to each other, e.g. by the respective distances of the two or more elements from each other. The relative positions, e.g. the relative distances, may be derived by the processors from the one or more images. In particular, the predetermined spatial configuration may completely or at least in part be defined by the respective relative positions, e.g. relative distances, of the representations of the elements in the captured image. The distance between two elements may be defined as the distance between respective reference points of the elements, e.g. respective centroids of an image of the elements, by a corner or another visible reference feature. In some embodiments, the spatial configuration is completely or partly defined by a geometric configuration of the elements. In some embodiments, a predetermined spatial configuration of two or more elements may be defined completely or in part by the respective orientations of the two or more elements relative to each other. In some embodiments, the predetermined spatial configuration is defined completely or in part by the respective orientations and positions, e.g. distances, of the two or more elements relative to each other.

Generally, in some embodiments, the tokens may each comprise one or more coupling members compatible with a toy construction system such that the tokens may also be used as toy construction elements operable to be detachably connected with other toy construction elements of the toy construction system, e.g. as decoration elements attachable to a toy construction model.

As described above, the plurality of toy elements may comprise a plurality of tokens. The tokens may be physical tokens, e.g. in the form of a plate, coin, cube, figurine or other tangible object. In some embodiments, the tokens may carry respective machine-recognisable markers that are recognisable by the processing unit in a captured image of the token. Alternatively or additionally, the tokens may have a visually recognisable shape or other visually recognisable features. The tokens may further have decorations or otherwise resemble or represent a function they represent so as to allow a user to associate the tokens with the respective user-interface elements or associated virtual functions they represent, i.e. so as to facilitate appropriate selection of tokens. In some embodiments, the tokens have the form of tiles that have a top face on which decorations and/or machine recognisable markers are placed. The tiles may have one or more coupling members on a bottom face of the tile so as to allow a user to detachably fasten the tile to a support structure.

In some embodiments, the image capturing device is a camera, such as a digital camera, e.g. a conventional digital camera. The image capturing device may be a built-in camera of a portable processing device. Generally, examples of portable processing devices include a tablet computer, a laptop computer, a smartphone or other mobile device. In some embodiments, the image capturing device comprises a 3D capturing device such as a 3D sensitive camera, e.g. a depth sensitive camera combining high resolution image information with depth information. An example of a depth sensitive camera is the Intel® RealSense™ 3D camera, such as the model F200 available in a developer kit from Intel Corporation. The image capturing device may be operable to capture one or more still images. In some embodiments the digital camera is a video camera configured to capture a video stream.

The processing unit is adapted to detect the toy elements in the captured image(s) and to recognise the toy elements. Recognition of a toy element further comprises identifying the corresponding virtual character or function with which a token is associated, e.g. the corresponding user-interface element allowing a user to activate the function. To this end, the system may comprise a library of known toy elements each associated with information about the corresponding associated function, virtual character etc., as the case may be.

Here and in the following, the term processing unit is intended to comprise any circuit and/or device suitably adapted to perform the functions described herein. In particular, the term processing unit comprises a general- or special-purpose programmable microprocessor, such as a central processing unit (CPU) of a computer or of another data processing system, a digital signal processing unit (DSP), an application specific integrated circuits (ASIC), a programmable logic arrays (PLA), a field programmable gate array (FPGA), a special purpose electronic circuit, etc., or a combination thereof. The processing unit may be integrated into a portable processing device, e.g. where the portable processing device further comprises the image capturing device and a music rendering device e.g. a loudspeaker or other audio output and a display. It will be appreciated, however, that the play system may also be implemented as a client-server or a similar distributed system, where the image capturing, music rendering and other user interaction is performed by a client device, while the image processing and recognition tasks may be performed by a remote host system in communication with the client device. According to some embodiments, an image capturing device or a mobile device with an image capturing device may communicate with a computer, e.g. by wireless communication with a computing device comprising a processing unit, data storage and a display.

In some embodiments, the image capturing device communicates with a display that shows in real-time a scene as seen by the image capturing device so as to facilitate targeting the desired toy elements whose image is to be captured. Alternatively or additionally, during rendering of the music, the display may show a real-time image of a real-world scene as seen by the image capturing device augmented by one or more virtual characters and, optionally, additional visual effects and/or graphical user-interface elements.

The music rendering device may include a loudspeaker or other audio output device, e.g. for rendering streams of audio data. The music rendering device may further comprise a display for presenting images, e.g. an augmented reality (AR) or entirely animated video of the music performance. The music rendering device may be integrated into the same apparatus, e.g. a mobile phone, tablet computer or the like, as the processing unit and/or the image capturing device.

The present disclosure relates to different aspects including the music play system described above and in the following, corresponding apparatus, systems, methods, and/or products, each yielding one or more of the benefits and advantages described in connection with one or more of the other aspects, and each having one or more embodiments corresponding to the embodiments described in connection with one or more of the other aspects and/or disclosed in the appended claims.

In particular, according to one aspect, disclosed herein is a method, implemented by a processing unit, of operating a music play system According to yet another aspect, disclosed herein is a processing device, e.g. a portable processing device, configured to perform one or more of the methods disclosed herein. The processing device may comprise a suitably programmed computer such as a portable computer, a tablet computer, a smartphone, a PDA or another programmable computing device, e.g. a device having an audio output device, a graphical user-interface and, optionally, a camera or other image capturing device.

Generally, the digital music play experience may be implemented as a computer program, e.g. as a computer readable medium having stored thereon the computer program. Accordingly, according to yet another aspect, disclosed herein is a computer program which may be encoded on a computer readable medium, such as a disk drive or other memory device. The computer program comprises program code adapted to cause, when executed by a processing device, the processing device to perform one or more of the methods described herein. The computer program may be embodied as a computer-readable medium, such as a CD-ROM, DVD, optical disc, memory card, flash memory, magnetic storage device, floppy disk, hard disk, etc. having stored thereon the computer program. In other embodiments, a computer program product may be provided as a downloadable software package, e.g. on a web server for download over the internet or other computer or communication network, or as an application for download to a mobile device from an App store. According to one aspect, a computer-readable medium has stored thereon instructions which, when executed by one or more processing units, cause the processing unit to perform an embodiment of the process described herein.

The present disclosure further relates to a toy construction set comprising a plurality of toy construction elements, including a plurality of tokens and/or figurines, and instructions to obtain a computer program code that causes a processing device to carry out the steps of an embodiment of one or more of the methods described herein, when the computer program code is executed by the processing device. For example, the instructions may be provided in the form of an internet address, a reference to an App store, or the like. The instructions may be provided in machine readable form, e.g. as a QR code or the like. The toy construction set may even comprise a computer-readable medium having stored thereon the computer program code. Such a toy construction set may further comprise a camera or other image capturing device connectable to a data processing system.

Generally, in some embodiments, each toy construction element of the toy construction system and, in particular, each token and/or figurine, comprises coupling members for detachably interconnecting the toy construction elements with each other to create coherent spatial structures, also referred to as toy construction models. Hence, toy construction elements that have been interconnected with each other by means of the coupling members can again be disconnected from each other such that they can be interconnected again with each other or with other toy construction elements of the system, e.g. so as to form a different spatial structure. In some embodiments, the toy construction elements are provided with a first and a second type of coupling members, such as coupling pegs and peg-receiving recesses for frictionally engaging the pegs, or other pairs of mating or otherwise complementary coupling members configured to engage each other so as to form a physical connection. One type of coupling members may be located on one side, e.g. the top side, of the toy construction element while another, complementary type of coupling members may be located on an opposite side, e.g. the bottom side, of the toy construction element. In some embodiments, the toy construction elements include pegs extending from the top face of the toy construction element and corresponding peg-receiving cavities extending into the bottom face of the toy construction element for frictionally engaging the pegs by a suitable clamping force. The coupling members may be positioned on grid points of a regular grid; in particular, the coupling members of the toy construction elements may be arranged such that the coupling members of a set of mutually interconnected toy construction elements are positioned on grid points of a three-dimensional regular grid. The dimensions of the toy construction elements may be defined as integer multiples of a unit length defined by the regular grid. It will be understood that a three-dimensional grid may be defined by a single unit length, by two unit lengths, e.g. one unit length applicable in two spatial dimensions while the other unit length is applicable in the third spatial dimension. Yet alternatively, the three-dimensional grid may define three unit lengths, one for each spatial dimension.

Additional features and advantages will be made apparent from the following detailed description of embodiments that proceeds with reference to the accompanying drawings.

BRIEF DESCRIPTION OF THE DRAWINGS

Preferred embodiments will be described in more detail in connection with the appended drawings, where FIG. 1 schematically illustrates an embodiment of the interactive music play system described herein.

DETAILED DESCRIPTION

Embodiments of the various aspects disclosed herein may be used in connection with a variety of toy objects and, in particular with construction toys that use modular toy construction elements with various assembly systems like magnets, studs, notches, sleeves, with or without interlocking connection etc. Examples of these systems include but are not limited to the toy constructions system available under the tradename LEGO. For example, U.S. Pat. No. 3,005,282 and USD253711S disclose one such interlocking toy construction system and toy figures, respectively.

Figure 1:
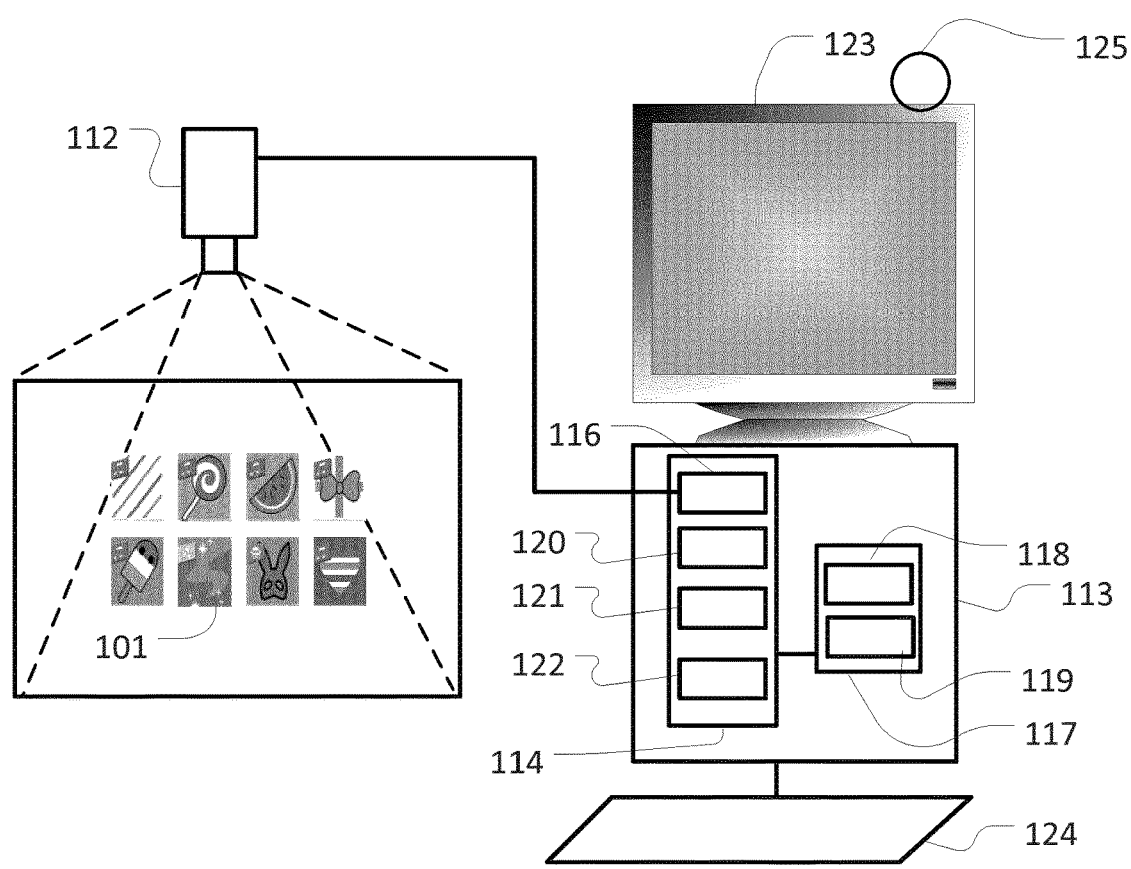

FIG. 1 schematically illustrates an embodiment of the interactive music play system described herein. The play system comprises one or more tokens 101 and a data processing device. The system may comprise additional tokens and/or other types of toy elements, such as figurines, other types of toy construction elements and/or the like, as described herein.

The data processing device comprises an image capturing device 112, a processing unit 113, a display 123, an audio output 125, (e.g. a loudspeaker, headphones, etc.), and a user input interface unit 124, such as a keyboard, a mouse, joystick, a touch-sensitive screen, etc. In some embodiments, the various components of the data processing device may be implemented as separate devices that are communicatively coupled to each other via wired or wireless connections. In other embodiments, some or all of the components may be integrated into a single device, e.g. in a tablet computer, a smartphone or the like.

The processing unit comprises a CPU 114 and a storage device 117, e.g. a hard disk, an EEPROM, a RAM or another suitable data storage device having stored thereon a computer program 118 and an element database 119 of known tokens, and/or figurines and/or toy construction models, etc. The element database may be stored separately from the computer program or as an integral part of the computer program. The element database 119 may alternatively be stored on a remote storage device accessible to the processing unit, e.g. via the internet or another suitable communication channel.

When the computer program is executed by the CPU 114 it implements a number of functional modules, including:
- a reading module 116 configured to receive a digital image from the digital image capturing device;
- a detection module 120 configured to detect one or more tokens and/or other toy elements in a digital image;
- a recognition module 121 configured to recognize one or more tokens and/or other toy elements from a digital image;
- a musical presentation creation module 122 configured to create an interactive audio-visual musical presentation responsive to the recognized toy elements.

The reading module 116, the recognition module 121, the detection module 120 and the musical presentation creation module 122 may be implemented as different modules of a software application or integrated into a single software application module. The reading module 116, the recognition module 121, the detection module 120 and the musical presentation creation module 122 may e.g. be implemented by a mobile application or a program executed on a client computer or other client device, thus eliminating the need of an internet or other network connection. Alternatively, the above modules may be implemented as a distributed system, e.g. a client-server or cloud-based architecture.

The reading module 116 is configured to receive one or more images, said images including one or more images of one or more tokens and/or one or more figurines and, optionally, other types of toy elements. The one or more images may be one or more still images or a video stream.

The detection module 120 is configured to detect one or more tokens and/or figurines in said received one or more images and, optionally, their relative positions and/or orientations within the one or more images. The detection module may further extract images of the detected elements from a background portion of the digital image. The detection module may thus be configured to segment a digital image and detect one or more toy elements in the digital image.

The recognition module 121 is configured to recognize the detected tokens and/or figurines in a digital image, i.e. to recognise tokens and/or figurines as known tokens or figurines, respectively. For example, the recognition module may recognise a marker, e.g. a visible code or identifier, on a detected token or figurine, or otherwise recognise one or more features of the token or figurine. To this end, the recognition module may have access to the element database 119 which may comprise a library of known toy elements. For each known toy element, the library may comprise information about the marker, code, identifier or other set of features that identify the toy element. The database may further comprise, for each known toy element, information identifying one or more functions, virtual characters and/or the like associated with the respective toy element. The recognition module may also be configured to recognize and track a reference toy as described herein.

The musical presentation creation module 122 creates an interactive audio-visual musical presentation based on the detected and recognized toy elements. For example, the musical presentation creation module selects or creates a virtual character, e.g. corresponding to the recognized figurine, and a number of user-interface elements, such as virtual buttons, corresponding the detected tokens. The musical presentation creation module then creates an audio-visual musical presentation where the selected virtual character performs a music piece, e.g. a song on a scene. The seen may be a predetermined, stored scene, a real-time captured video that is augmented with the virtual character, a scene depicting a previously captured image, a virtual scene created based on a captured image, or the like.

In some embodiments, the recognition module may be operable to recognize other toy construction models and/or other toy elements and the music creation module may be configured to create a virtual scene based on the recognized toy construction model and/or toy element, e.g. a scene resembling the toy construction model or otherwise represented by the toy construction model and/or toy element. The musical presentation creation may then create the interactive audio-visual musical presentation to show a music performance on the recognised scene.

The musical presentation creation module further displays the selected user-interface elements and monitors activation of the user-interface elements by the user. Responsive to such activation, the musical presentation creation module modifies the presentation, e.g. by adding visual and/or audible effects, changing an outfit/costume of the virtual character, letting the character perform special moves, and/or the like.

The system may allow update of the element database, e.g. via a suitable computer network, e.g. so as to allow the system to recognise new toy elements. Also, the system may be updated with new music pieces, scenes, etc.

Figure 2:
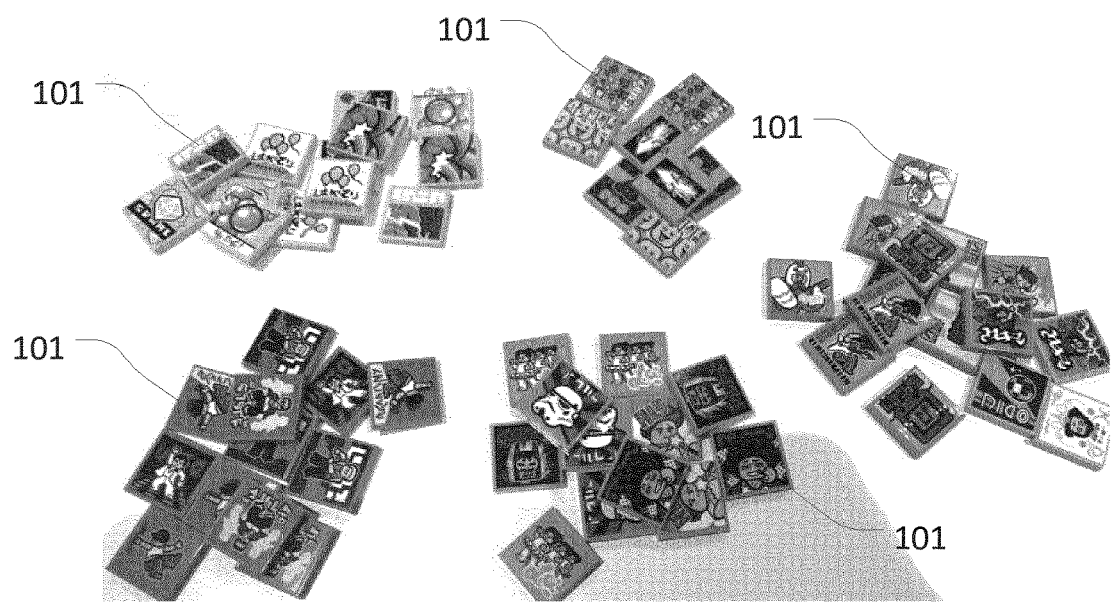
FIG. 2 shows an example of tokens.

FIG. 2 shows an example of tokens 101. The tokens have the form of a plate/tile having a square periphery. Generally, the token may be manufactured from any suitable material, such as plastic, metal or wood, preferably sufficiently rigid to allow detachable mechanical connection to a base plate or other support structure, e.g. by interlocking and/or friction-based attachment. It will be appreciated that other embodiments of tokens may have a different shape, such as a plate having a differently-shaped periphery, or a cube or any other three-dimensional shape.

Each token defines a top surface which is decorated by a suitable decoration, e.g. an illustration illustrating the function/effect on a virtual music video associated with the token. The token is further provided with a machine-readable code which in this example is embedded in the decoration. It will be appreciated that other embodiments of tokens may be provided with other visually detectable markers, such as QR codes, color codes, etc. In some embodiments, the markers is integrated into the decoration, e.g. in a manner that the marker can readily be recognised as a marker or in an imperceptible manner. In some embodiments different sides of a token may be provided with different codes or markers such that a token may trigger different functions depending on which side is visible to the camera which is used to capture an image of the token.

Figure 3:
FIG. 3 shows examples of figurines.

FIG. 3 shows an example of figurines 102 representing respective artists/performers. The figurines are compatible with a toy construction system and include coupling means for detachable attachment to other toy construction elements and/or a support structure. In the present example, the figurines are figurines available under the name LEGO minifigures. Each figurine is provided with a machine-readable visual feature (e.g. a code, insignia, decoration) which, in this example, is embedded in a decoration on the torso and/or other parts of the figurine.

It will be appreciated that other embodiments of figurines may be provided with other visually detectable markers, such as QR codes, color codes, etc. In some embodiments, the heads, torsos, legs, hair, clothing, accessories and/or other parts of the figurines may be detached from the other parts of the figurine and, optionally, be replaced by other parts, e.g. a different head, torso, legs, etc. In this manner the user may construct a large variety of different figurines from the individual parts. The thus created customized figurines may all be recognizable by the processing unit; for example, the processing unit may be configured to individually recognize the individual parts of a figurine in a captured image of the figurine.

Figure 4A:
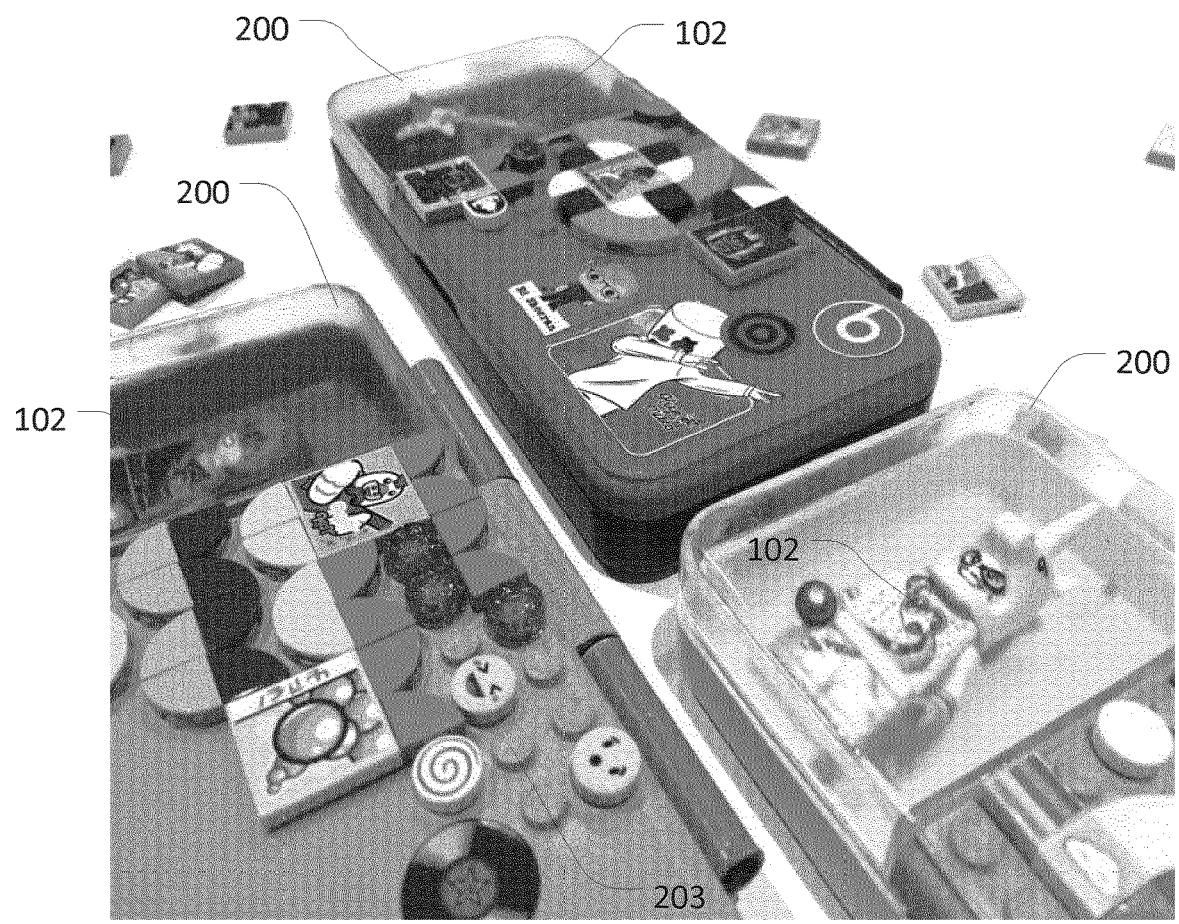
FIGS. 4A-B illustrate an example of a storage container for the tokens and figurines shown in FIGS. 1-2.
Figure 4B:
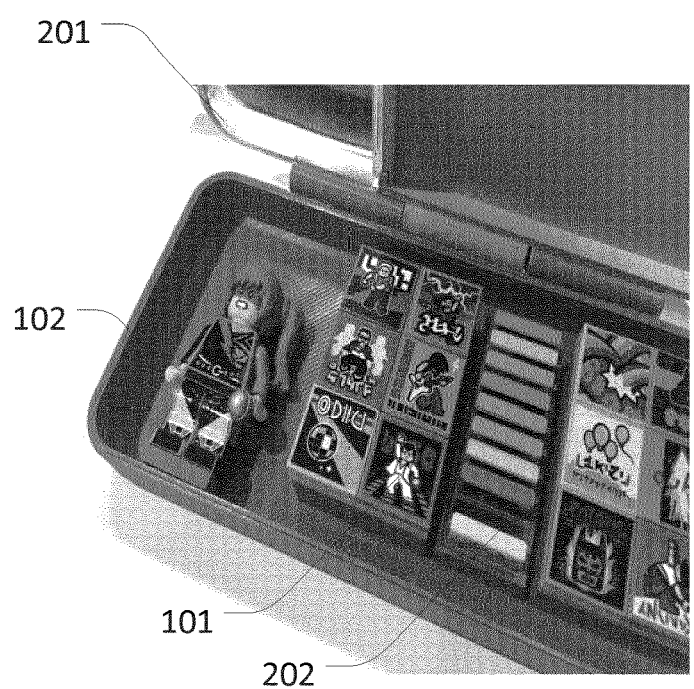

FIGS. 4A-B illustrate an example of a storage container 200 for the tokens and figurines shown in FIGS. 1-2. The container is a plastic box having a hinged lid 201. The lid is partially transparent and partially opaque, such that only a part of the contents of the box are visible when the lid is closed. In this example, the box provides storage for one figurine 102 and a plurality of tokens 101. In the present example, the figurine is visible through the transparent portion of the lid when the lid is closed while the tokens are only visible when the lid is open.

FIG. 4A shows three boxes with their lids closed while FIG. 4B shows a box with the lid open.

The inner walls of the box comprise coupling members to which the figurine can be detachably attached, so as to prevent the figurine to move around the box when the box is carried, tilted, etc.

Similarly, the box comprises coupling members to which tokens can be attached in a side-by-side pattern such that their decorations are visible when the lid is open. The box further comprises slots 202 into which additional tokens can be inserted for storage but which do not provide a view of the decorations of the tokens stored in the slots. The user may thus select a subset of tokens for display and/or scanning and attach them to the coupling members while storing additional tokens in the respective slots.

The box further serves as a support structure for holding the figurine and the tokens in a predetermined spatial arrangement as determined by the arrangement of coupling members for attaching the figurine and the tokens. Hence, with the lid open, the user may capture an image of the figurine and the visible tokens as described herein, so as to allow reliable recognition.

In the present example, the outer surface of the lid comprises further coupling members 203 for attaching decorative toy construction elements. It will be appreciated that different embodiments of boxes may be provided in different sizes and shapes. They may e.g. be configured to accommodate more than one figurine and/or a different number of tokens.

Figure 5A:
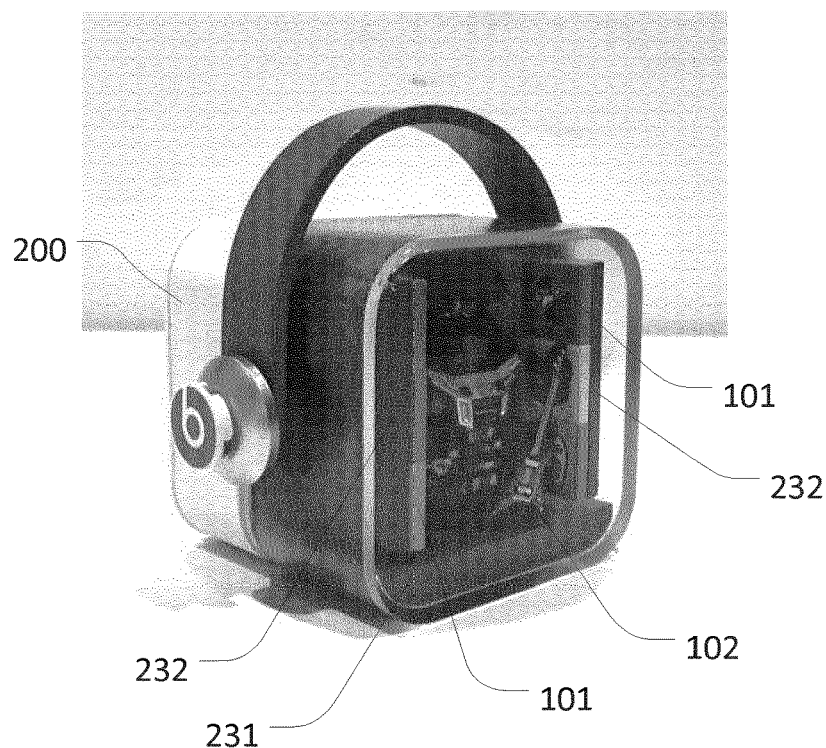
FIGS. 5A-B illustrate another example of a storage container for the tokens and figurines shown in FIGS. 1-2.
Figure 5B:
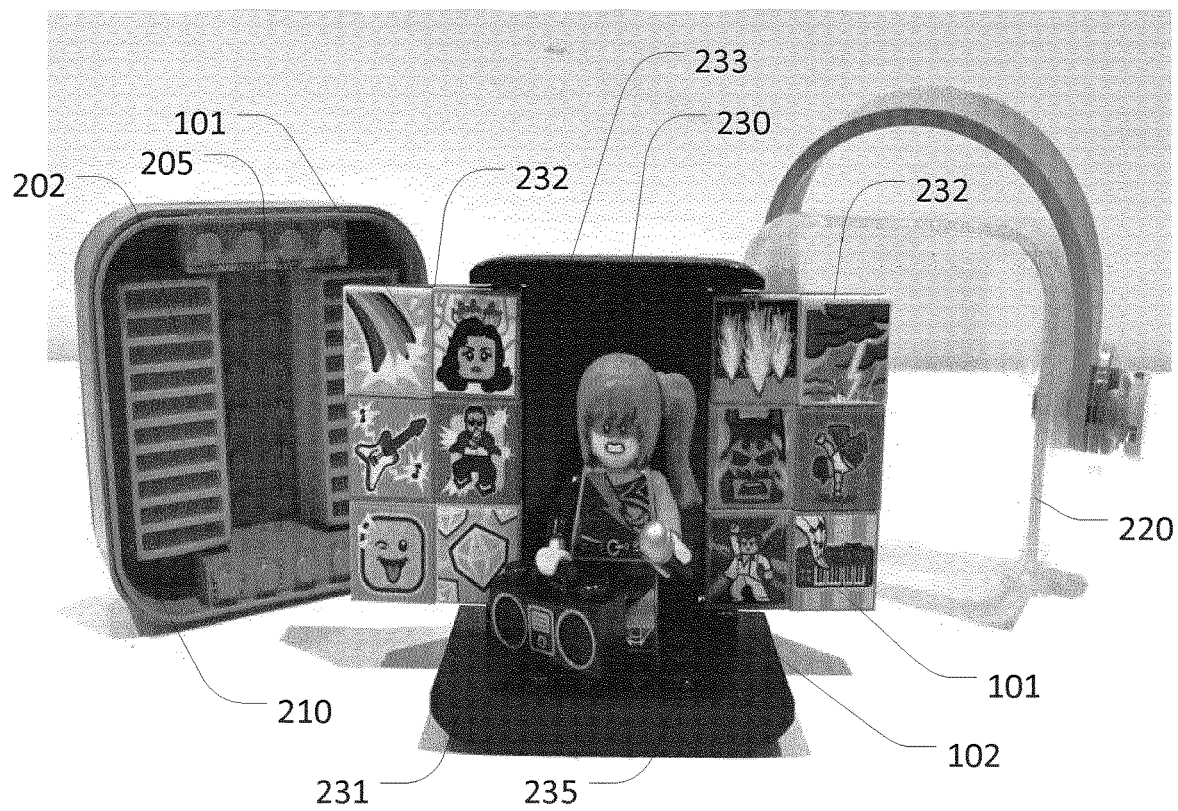

FIGS. 5A-B illustrate another example of a storage container 200 for the tokens 101 and figurines 102 shown in FIGS. 1-2. The container is a plastic box having a base portion 210, a transparent lid portion 220 and an insert portion 230. In this example, the box provides storage for one figurine 102 and a plurality of tokens 101. In the example, the figurine is visible through the transparent lid when the lid is closed while the tokens are partially obstructed from view when the lid is closed.

FIG. 5A shows a box with the lid closed while FIG. 5B shows a box with the lid open and the insert portion removed from the box.

The base portion comprises a bottom wall 231 and side walls formed by display panels 232 defining a hollow. Storage structures for tokens extend from the bottom wall into the hollow. The storage structure defines a plurality of slots 202 into which tokens may be slidably inserted. The base portion further comprises coupling members 205 to which the insert portion may be slidably attached. The insert portion comprises a base 231 and a rear wall 233 extending upwardly from the base. Two token display panels 232 are movably—in this example hingedly—connected to respective sides of the rear wall such that the panels may be moved between an extended state and a retracted state each panel defines an forwardly facing surface comprising coupling members to which tokens may be detachably attached in a side-by-side arrangement with the decorations of the tiles facing inward. The base of the insert portion is also provided with coupling members 235 for receiving and retaining a figurine. When the panels are in the extended position they are positioned on respective sides of a figurine attached to the base such that the figurine and all tokens attached to the panels can be viewed by a camera, i.e. the insert portion forms a support structure for storing and displaying the figurine and the tokens that are attached to the panel. In this configuration the insert resembles a stage. The figurine stands on the stage and the tokens form decorations on either side of the stage. In the retracted state the panels form side walls of a partially box-shaped structure where the base, the rear wall and the panels partially surround the figurine. In this state the insert portion can be attached to the coupling members of the base portion of the box so as to allow the lid to be closed. When the box is closed the insert portion is thus complete accommodated inside the box.

The user may thus select a subset of tokens for display and attach them to the coupling members of the panels while storing additional tokens in the respective slots defined by the base portion of the box.

The insert portion of the box further serves as a support structure for holding the figurine and the tokens in a predetermined spatial arrangement as determined by the arrangement of coupling members for attaching the figurine and the tokens. Hence, with the lid open and the insert removed from the base portion of the box, the user may capture an image of the figurine and the visible tokens as described herein.

It will be appreciated that the position of the various storage elements in the box, the capacity of the box, the shape and size of the box may vary from embodiment to embodiment.

Figure 6:
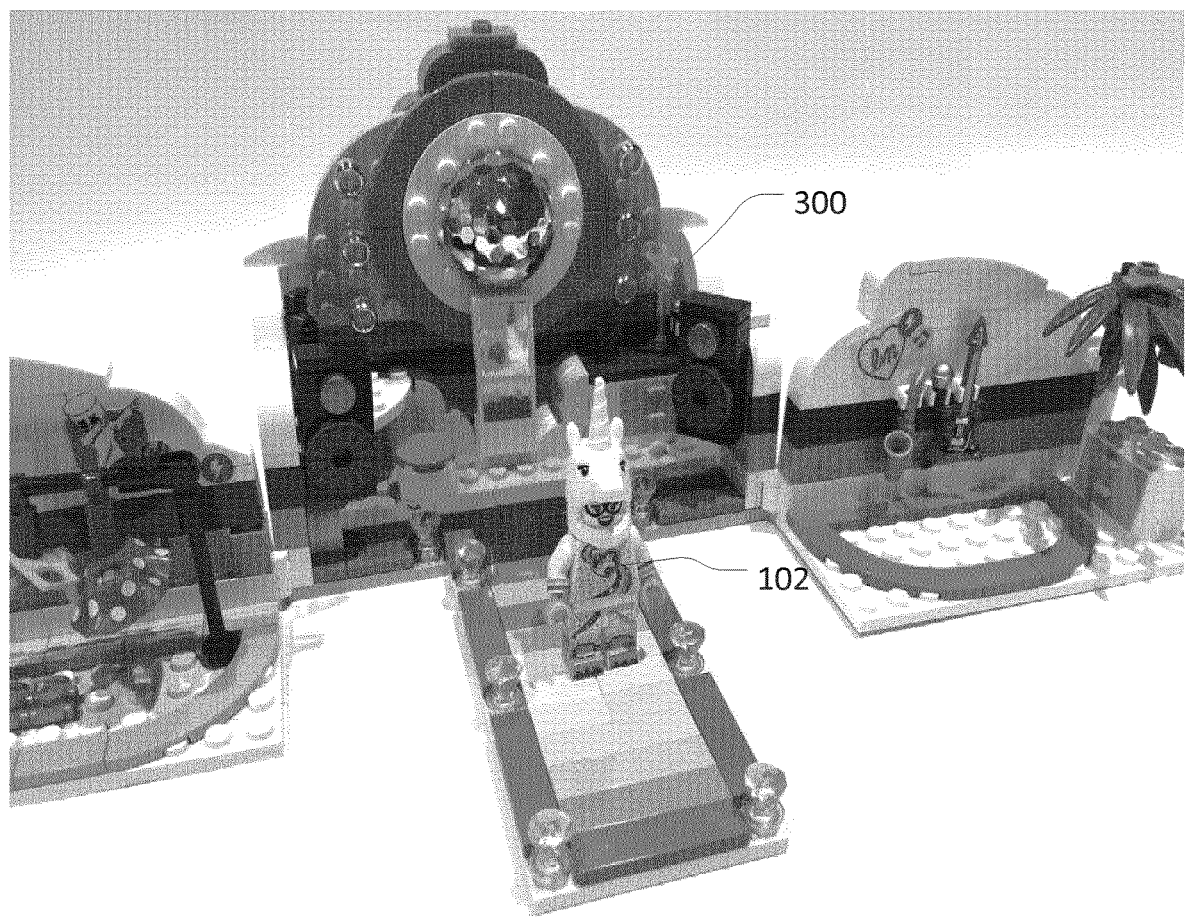
FIG. 6 illustrates an example of a toy construction model representing a scene constructed from toy construction elements.

FIG. 6 illustrates an example of a toy construction model 300 representing a scene constructed from toy construction elements. In this example, the scene represents a stage and a figurine 102 is placed on the stage. It will be understood that other embodiments may include toy construction models resembling other real-life or phantasy structures, e.g. a truck, a building, a park or other form of natural or artificial scenery, etc. In some embodiments, the system may be configured to capture one or more images of the constructed stage or other toy construction model, optionally with the figurine placed on the stage, and to create an audio-visual musical presentation with a virtual character corresponding to the figurine performing on the stage. The system may further allow the user to capture one or more images of user-selected tokens. To this end, the tokens may be attached to the model and a single image may be captured of the scene with the tokens attached. Alternatively, an image of the tokens may be captured separately from the image of the scene.

Figure 7A:
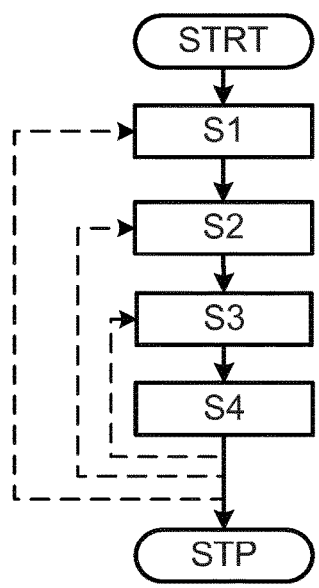
FIGS. 7A-B illustrate an example of a use of the system described herein.
Figure 7B:
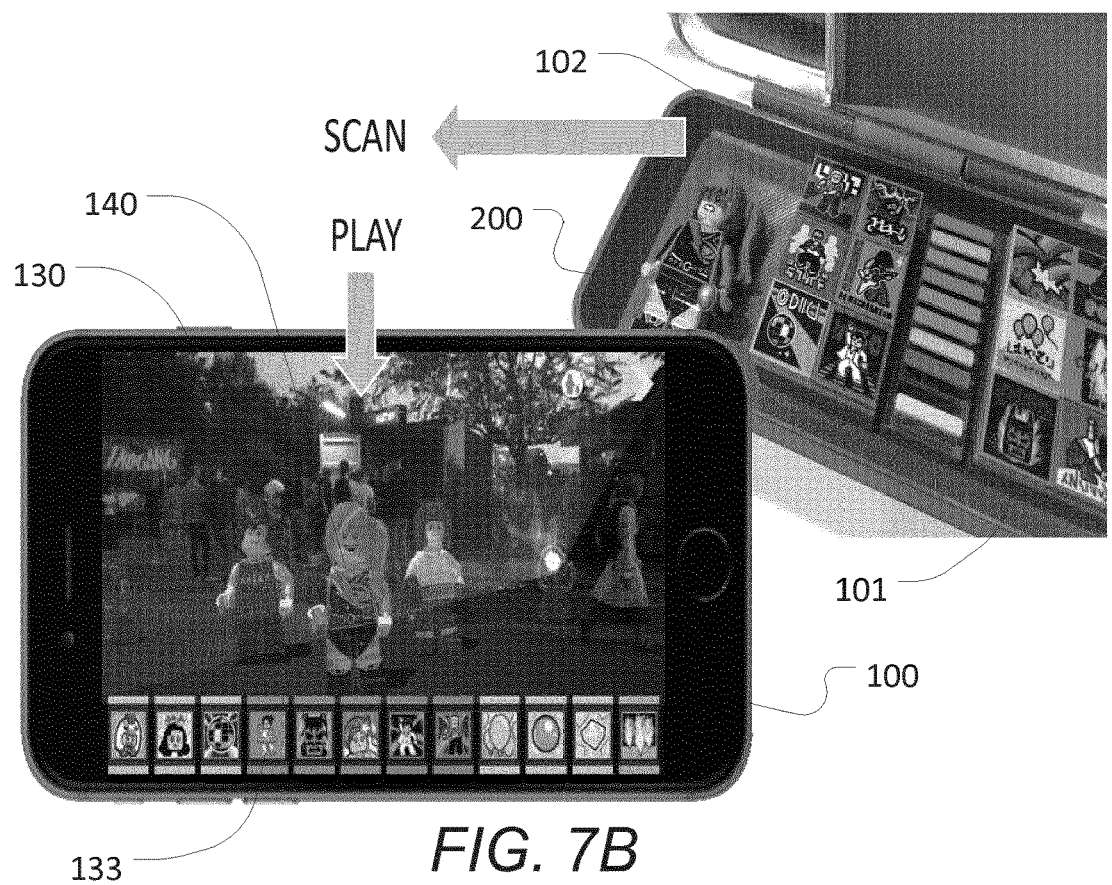

FIGS. 7A-B illustrate an example of a use of the system described herein. In particular, FIG. 7A shows a flow diagram of a method of controlling a play system while FIG. 7B shows a portable processing device 100 carrying out the method, and a storage container 200 for storing tokens 101 and a figurine 102.

In step S1, the user uses a suitably programmed processing device (e.g. a mobile phone running a suitable app) to capture an image of a set of user-selected tokens 101 and, optionally, of a figurine 102. To this end, the user-selected set of tokens may be arranged on a support such as in a storage container 200 as described herein.

Optionally, in step S2, the system may provide a user interface that allows a user to select and/or customize one or more virtual characters, e.g. by adding accessory items, clothing items or define dance moves as described herein. If the system has selected a virtual character, e.g. based on the recognized figurine, the user may still be given the opportunity to customize the virtual character.

In step S3, the system selects a piece of music and a scene. This selection may e.g. be based on user inputs, based on the recognised figurine, etc. In some embodiments, the mobile phone captures a video of a real-world scene and the captured video is used as a scene.

In step S4, the system creates an audio-visual musical presentation of the selected piece of music. The musical presentation shows one or more virtual characters 140 performing the piece of music. In some embodiments, one or more of the virtual characters correspond to the figurine recognised in the captured image. It will be appreciated that, in some embodiments, the system may capture an image of multiple figurines, e.g. representing a band, or multiple images of respective figurines. In other embodiments, the user may select the virtual character in a different manner, e.g. by selecting a virtual character from a list menu. The virtual characters are shown as performing the piece of music within the selected scene, e.g. on a stage, or as an augmented reality presentation overlaid or otherwise combined with a real-time video feed of a real-world scene.

The system further shows a number of virtual buttons 133 and/or other graphical user-interface elements—in the example of FIG. 7B arranged along a bottom edge of the display area 130—which can be activated by a user during the playing of the musical presentation. The respective user-interface elements correspond to the tokens recognized by the system in the captured image of the figurine and tokens. Activation of one or more of the user-interface elements 133 during the presentation of the musical presentation causes visual and/or audible effects to be added to the presentation, where different user-interface elements trigger different effects.

It will be appreciated that the system may provide additional functionality in respect of the musical presentations, such as pausing, rewinding, forwarding the presentation and/or the like. The system may further allow the user to store the presentation, e.g. as a video, as a suitable file format, e.g. as an mp4 file, and/or to share the presentation with other devices, e.g. by uploading a video to an internet server, a social media platform and/or the like. The stored/shared presentation may include the additional effects added by the user by activating the user-interface elements.

In some embodiments, the system may be configured to capture a live video of the constructed stage or other reference toy, e.g. a toy construction model, optionally with the figurine placed on or near the reference toy, The system may be configured to recognize the reference toy among a set of one or more recognisable reference toys and track the position and orientation of the reference toy in the captured video. The system may be configured to create and present an augmented-reality presentation where virtual characters are shown as moving about the reference toy and performing a selected piece of music. The augmented reality presentation may further include user-activatable user-interface elements that can be activated by the user during the augmented reality presentation and trigger respective functions as described herein.

In some embodiments the system may be configured to detect features of the reference toy that can be modified by the user, e.g. a feature that can selectively be added to the reference toy or removed from the reference toy, or that can otherwise be modified between at least a first state and a second state. Examples of such features may include the position or orientation of one or more movable parts, the presents (and optionally position and/or orientation) of a recognizable marker element and/or the like. The marker element may be recognisable in a number of ways, e.g. recognisable in the captured video. To this end, the marker element may include an insignia, predetermined one or more colors or another visible feature. The system may then create or modify the augmented-reality presentation responsive to the detected features, e.g. responsive to the presence of the recognised marker and/or responsive to the detected position and/or orientation of the marker or other detected feature. For example, different marker elements may trigger different stage lighting effects, different sound effects, the presence or absence of other virtual objects, such as instruments, an audience, and/or the like. The detected position and/or orientation of the detected features may e.g. trigger the position at which the virtual artist or other virtual character or object or other visual effect is positioned relative to the toy construction model. The detection of such modifiable features may be part of the initial recognition of the reference toy. Alternatively or additionally, the detection of such modifiable features may be performed during the tracking of the reference toy, thus allowing the user to influence the musical presentation in real time by modifying the physical reference toy.

The initial detection and recognition of the reference toy and, optionally, the detection of the modifiable features of the reference toy may be based on any suitable detection and recognition method as generally known in the art of computer vision. The detection may be based on predetermined markers on the reference toy, on detectable features, such as edges, corners, etc. The recognition may be based on a machine learning technology, such as based on neural networks and/or any other suitable technology known as such in the art. The detection and recognition may result in the recognition of the reference toy as one of a set of predetermined reference toys. The process may thus retrieve additional information associated with the recognized reference toy. Additionally, the detection of the reference toy may include the detection of a position and orientation of the reference toy relative to a suitable reference, e.g. the position and viewing angle of the image capturing device, or the detection of the position and orientation of the object in the captured image. Accordingly, the system may track the position and orientation of the reference toy in the live video stream captured by the system.

In some embodiments, the detection and recognition of the reference toy may be performed during an initialisation phase. To this end, optionally, the AR system may allow the user to enter a selection indicative of a reference toy to be used. The user may be prompted to direct the image capturing device towards the reference toy. To this end, the AR system may display a virtual frame or an outline of the selected reference toy so as to aid the user in positioning the image capturing device. Once the AR system has recognised the selected reference toy in the captured image, the AR system may track the recognised reference toy in the subsequently captured images even when the viewpoint of the image capturing devices changes.

Generally, the system may create and render the computer-generated content at a position in the displayed image relative to the detected position and orientation of the reference toy.

In some embodiments, the detection of the tokens or other toy elements described herein may be implemented as a separate step, e.g. prior to capturing images of the reference toy. Alternatively, toy elements representing user-activatable functions may be positioned on or near the reference toy and recognized in the captured video of the reference toy.

Upon completion of the presentation, the process may return to any of steps S1-S3 to repeat some or all parts of the experience. Alternatively or additionally, the system may provide functionality for storing and/or sharing the created presentation.

Figure 8:
FIGS. 8-10 illustrate screen shots of different examples of created visual presentations.
Figure 9:
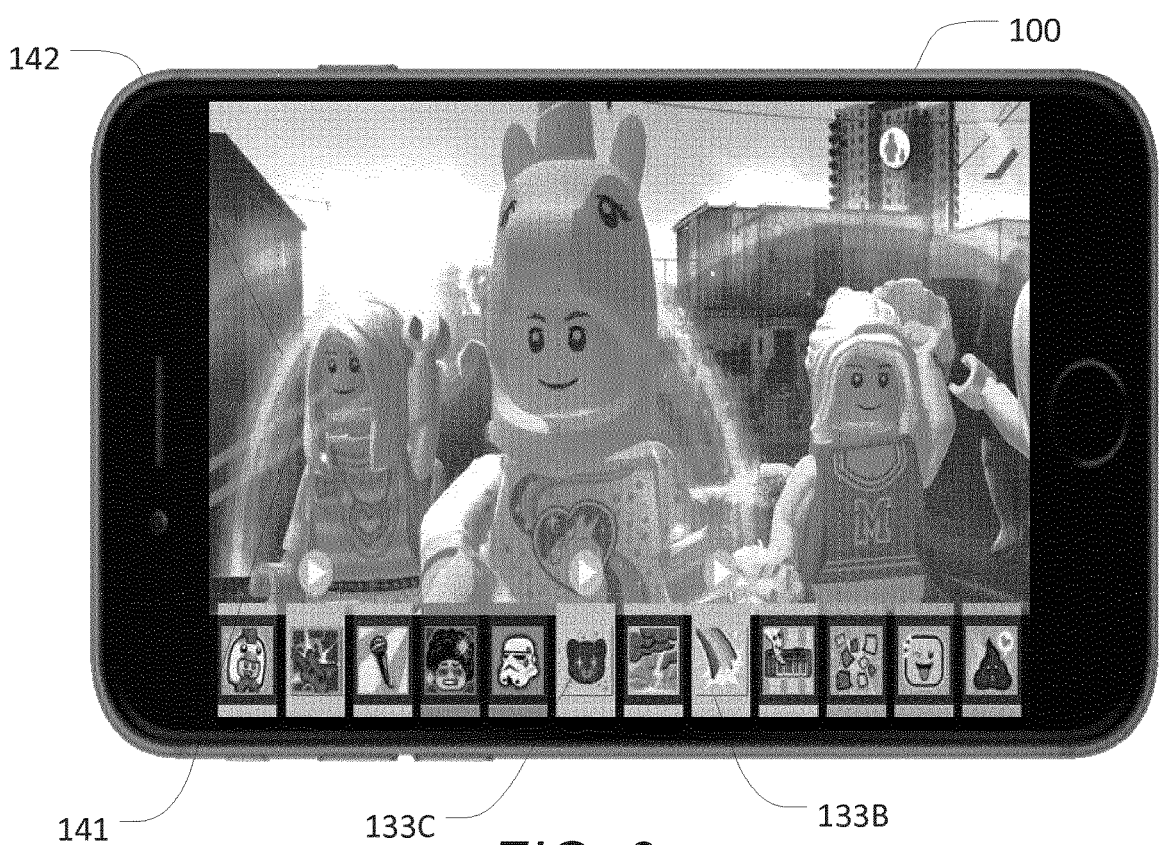
Figure 10:
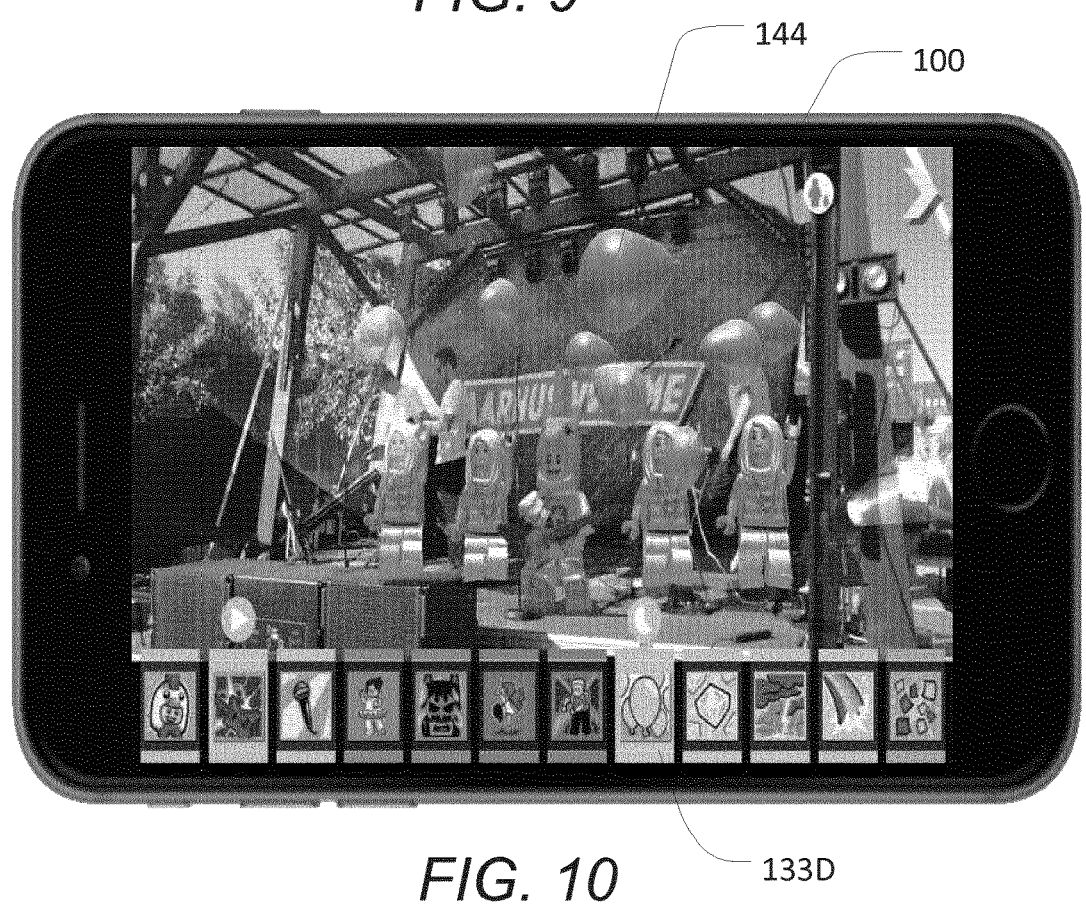

FIGS. 8-10 illustrate screen shots of a display of a portable processing device 100 carrying out an embodiment of the method described herein. In particular, FIGS. 8-10 illustrate screen shots of different examples of created musical presentations, illustrating different virtual characters, different scenes and different added visual effects.

For example, FIG. 8 shows an example where the user has activated a virtual button 133A causing one of the virtual characters 140A to use a virtual guitar 141 to play a guitar solo. In the example of FIG. 9, the user has also activated the display of a virtual rainbow 142 and simulated "laser eyes" 143 by pressing virtual buttons 133B and 133C, respectively. In the example of FIG. 10, the user has activated the inclusion of virtual balloons 144 by pressing virtual button 133D.

As can be seen from the examples, the virtual characters are scaled in size relative to the background scene. This scaling may be performed responsive to a user input or based on an automatic detection of a relevant scale, e.g. the height of detected persons, the dimensions of a detected plane, etc.

Although the invention has been described with reference to certain specific embodiments, various modifications thereof will be apparent to those skilled in art without departing from the spirit and scope of the invention as outlined in claims appended hereto. For example, the various aspects disclosed herein have mainly been described with reference to music performances. However, it will be appreciated that the various aspects described herein may also be applied to other types of play experiences, e.g. story-telling, acting, role play, etc.

The invention claimed is:

1. An interactive music play system, comprising:
a plurality of toy elements, an image capturing device, a processing unit and a music rendering device,
wherein the processing unit is configured to:
recognize a user-selected subset of toy elements in one or more captured images, captured by the image capturing device, of the user-selected subset of said toy elements arranged in a field of view of the image capturing device;
create a musical presentation and cause the music rendering device to present the created musical presentation to the user;
cause the music rendering device to provide, responsive to one or more of the recognized toy elements, one or more user-activatable user-interface elements, and
cause the music rendering device to alter, responsive to a user-activation of one or more of the user-interface elements, the presented musical presentation.

2. The system according to claim 1, wherein:
the plurality of toy elements comprises a plurality of tokens configured to be individually recognizable and distinguishable from each other by the processing unit in an image depicting at least one or more of the tokens, and
the processing unit is adapted to:
cause the music rendering device to provide, responsive to recognizing one or more of the tokens in the one or more captured images, one or more user-activatable user-interface elements, and
cause the music rendering device to alter, responsive to a user-activation of one or more of the user-interface elements, the presented musical presentation.

3. The system according to claim 1, wherein:
the plurality of toy elements comprises one or more figurines, each representing an artist or music performer, and the processing unit is configured, responsive to recognizing the one or more figurines in
the one or more captured images, to select a virtual character associated with the recognized figurine and to create an audio-visual presentation showing the virtual character performing a piece of music.

4. The system according to claim 1, wherein:
the plurality of toy elements comprises one or more figurines, each representing an artist or music performer, and
the processing unit is configured to create an interactive audio-visual presentation showing a virtual character performing a piece of music and, responsive to recognizing the one or more figurines as corresponding to the virtual character, to modify the created interactive audio-visual presentation.

5. The system according to claim 1, wherein the processing unit is configured to create, from one or more images, captured by the image capturing device, of a real-world scene or of a representation of a real-world scene, an audio-visual presentation showing a virtual character moving about a representation of the real-world scene and performing a piece of music.

6. The system according to claim 5, wherein the created audio-visual presentation includes an interactive augmented-reality presentation of the real-world scene augmented with virtual characters performing the piece of music.

7. The system according claim 1, wherein the processing unit is configured to recognize a reference toy in a captured live video, captured by the image capture device, to track the position and orientation of the reference toy in the captured live video and to create an augmented-reality presentation where one or more virtual characters are shown as moving about the reference toy and performing a selected piece of music.

8. The system according to claim 7, wherein the processing unit is configured to detect at least one user-modifiable feature of the reference toy and to create or modify the augmented-reality presentation responsive to the detected one or more user-modifiable features.

9. The system according to claim 7, wherein:
at least one of the toy elements is a figurine, and
creating the musical presentation comprises:
  selecting at least one virtual character responsive to recognizing a figurine by the processing unit in one or more images, captured by the image capturing device, of a real-world scene,
  creating an interactive audio-visual musical presentation from the one or more captured images of the real-world scene and including a representation of the selected at least one virtual character within the scene, and
  animating the representation of the virtual character to represent performance of a piece of music by said virtual character within the scene.

10. The system according to claim 9, wherein animating the representation of the virtual character includes scaling the representation of the virtual character relative to the scene.

11. The system according to claim 7, further comprising a storage container for storing the toy elements of the system described herein, the storage container including a support structure for supporting the toy elements when an image is captured of the toy elements arranged in a predetermined spatial configuration relative to each other by the image capture device.

12. The system according to claim 7, wherein the system is configured to provide functionality allowing a user to define movements to be performed by one or more virtual character, and wherein the processing unit is configured to create an audio-visual presentation showing the virtual character performing a piece of music; wherein the character performs the user defined movements.

13. The system according to claim 12, wherein:
the processing unit is configured to process a captured video, captured by the image capturing device, of a person performing a movement, and to detect the performed movement, and to map the detected movement onto the virtual character.

14. A computer-implemented method of operating a music play system, the method comprising:
recognizing a user-selected subset of toy elements in one or more captured images of the user-selected subset of said toy elements arranged in a field of view of an image capturing device;
creating a musical presentation and presenting the created musical presentation to the user;
providing, responsive to one or more of the recognized toy elements, one or more user-activatable user-interface elements; and
altering, responsive to a user-activation of one or more of the user-interface elements, the presented musical presentation.

15. A music play system comprising:
a plurality of toy elements, wherein at least one of the toy elements is a figurine;
a camera configured to capture images;
a musical rendering device module; and
a processing unit configured to:
  receive images from the camera;
  recognize a user-selected subset of the toy elements in one or more of the images; and
  create a musical presentation and cause the music rendering device to play the musical presentation,
wherein the musical presentation includes: selecting a virtual character based on the figurine, including a representation of the virtual character in the musical presentation, and animating the representation of the virtual character to represent performance of a piece of music by the virtual character.

16. A music play system comprising:
a plurality of toy elements, wherein at least one of the toy elements is a figurine;
a camera configured to capture images;
a musical rendering device module; and
a processing unit configured to:
  receive images from the camera;
  recognize a user-selected subset of the toy elements in one or more of the images; and
  create a musical presentation responsive to the recognized user-selected subset of the toy elements, and cause the music rendering device to play the musical presentation.

* * * * *